United States Patent [19]

Fox et al.

[11] Patent Number: 4,632,774

[45] Date of Patent: Dec. 30, 1986

[54] PROCESS FOR REFORMING ALCOHOLS

[75] Inventors: Joseph R. Fox, Solon; Frederick A. Pesa, Aurora; Benedict S. Curatolo, Maple Hts., all of Ohio

[73] Assignee: The Standard Oil Company, Cleveland, Ohio

[21] Appl. No.: 531,965

[22] Filed: Sep. 14, 1983

[51] Int. Cl.$^4$ .............................................. C01B 3/22
[52] U.S. Cl. ................................ 252/373; 48/197 R; 502/177
[58] Field of Search ..................... 252/373; 502/177; 48/197 R

[56] References Cited

U.S. PATENT DOCUMENTS

| | | |
|---|---|---|
| 2,409,235 | 10/1946 | Atwell ................................. 502/177 |
| 2,755,228 | 7/1956 | Anborn et al. ...................... 252/373 |
| 3,625,665 | 12/1971 | Thompson .......................... 518/704 |
| 3,865,750 | 2/1975 | Rase et al. ........................... 252/443 |
| 3,871,998 | 3/1975 | Rase et al. ........................... 208/216 |
| 4,110,082 | 8/1978 | Michaels-Christopher ...... 48/197 R |
| 4,316,880 | 2/1982 | Jockel et al. ........................ 252/373 |

FOREIGN PATENT DOCUMENTS

| | | |
|---|---|---|
| 38682 | 10/1981 | European Pat. Off. ............ 252/373 |
| 6048252 | 9/1979 | Japan . |
| 7007254 | 6/1980 | Japan . |
| 7007255 | 6/1980 | Japan . |
| 697472 | 9/1953 | United Kingdom ................ 252/373 |

OTHER PUBLICATIONS

*Chemical Abstracts,* 95: 117343e, 23 Oct. 1979.
Finegold et al, "Dissociated Methanol as a Consumable Hydride for Automobiles and Gas Turbines", *Adv. Hydrogen Energy,* vol. 3, (1982), pp. 1359–1369.
*Chemical Abstracts,* Ritschel et al, 93: 149427x, 1980.
Matsumoto et al, *Chemical Abstracts,* vol. 89, No. 131991j, (1978).

*Primary Examiner*—Natalie Trousof
*Assistant Examiner*—Bruce D. Gray
*Attorney, Agent, or Firm*—Sue E. McKinney; Joseph G. Curatolo; Larry W. Evans

[57] ABSTRACT

A process is provided for the reforming of alcohols, particularly methanol, in the presence of Group VIIA and VIIIA metal carbides at elevated temperature.

15 Claims, No Drawings

PROCESS FOR REFORMING ALCOHOLS

BACKGROUND OF THE INVENTION

This invention relates to a process for catalytically reforming alcohols. More particularly, the invention relates to a process for reforming alcohols into a product gas containing hydrogen and carbon monoxide, in the presence of metal carbide catalysts.

Alcohols, in particularly methanol, have been proposed for several years as alternatives to conventional fuels such as gasoline. One such proposal, Feingold, et al. *Decomposing Methanol As a Consumable Hydride for Automobiles and Gas Turbines* Hydrogen Energy Progress IV, Volume 3, 1982, pp. 1359-1369, envisions methanol being used as a hydrogen storage medium which releases hydrogen through dissociation. For example, methanol can be stored until needed, and then dissociated thermally or catalytically over platinum, palladium, copper, or zinc catalysts. In this system, both hydrogen and carbon monoxide can combust to provide energy for conventional combustion or gas turbine engines.

European Patent Application No. 38,682 discloses a process for the production of synthesis gas from methanol in the vapor phase at elevated temperatures utilizing a catalyst comprising a crystalline silica modified by inclusion of cobalt in the crystal lattice in place of a portion of the silicon atoms.

Japanese Publication No. J5 6048-252 describes the dissociation of methanol to form hydrogen, carbon monoxide, and methane at a temperature of 300°-800° C. utilizing catalysts which are metals selected from Cr, Mn, Fe, Co, Ni, Cu, and Zn, or oxides thereof, or platinum group metals selected from Rh and Ru, carried on crystalline aluminosilicate zeolite.

U.S. Pat. No. 2,755,228 discloses the conversion of liquid hydrocarbons such as gas, oil, whole crude, reduced crude, and coke still distillate in the presence of hydrogen to produce gaseous hydrocarbons and gasoline utilizing catalysts including one or more metals of groups V, VI, and VIII of the periodic table and the oxides of the metals, particularly Cr, Mo, W, Co, and Ni, in which at least part of the metal (25-50%) is in the carbide form.

Problems encountered with catalytic reforming of alcohols include formation of undesired by-products such as methane and loss of activity of conventional catalysts due to carbon deposition on the catalyst. This loss of activity results in the need for continual regeneration of the catalyst after short periods of use.

Thus, it is an object of the present invention to provide a process for production of synthesis gas ($H_2$/CO) with high selectivity from alcohol. It is a further object of the present invention to provide a process utilizing a catalyst for the reforming of alcohols which is not detrimentally affected by deposition of carbon.

SUMMARY OF THE INVENTION

We have discovered a process by which alcohols, particularly methanol, can be converted to carbon monoxide and hydrogen catalytically while minimizing hydrocarbon formation, such as methane, utilizing Group VIIA and VIIIA metal carbides. According to the process of the present invention, synthesis gas could in essence be stored and transported in the form of methanol or other alcohol, which could be decomposed at the point of need back to carbon monoxide and hydrogen for combustion, or for other purposes.

For example, in addition to use as a source of hydrogen and carbon monoxide for combustion, alcohols may be reformed to produce synthesis gas for use as reactants or feed gases in other reactions. This process would find particular utility in conjunction with a synthesis gas upgrading process in which methanol or another alcohol was formed as an undesirable by-product. Methanol or other alcohols formed in the upgrading reaction could be separated and reformed into carbon monoxide and hydrogen for recycle to the upgrading reaction in order to maximize the yield of desired products.

In general, the present invention includes a process for reforming alcohols comprising contacting an alcohol with a catalyst comprising a carbide of a metal selected from Groups VIIA and VIIIA, at a temperature of about 200° C. to about 600° C.

In a preferred embodiment of the invention, a process is provided for reforming methanol comprising contacting methanol at a temperature of about 200° C. to about 600° C. with a catalyst comprising a carbide of a metal selected from iron, cobalt, manganese and mixtures thereof.

DETAILED DESCRIPTION OF THE INVENTION

Reactants

The alcohols useful in the process of the present invention are generally low molecular weight alcohols or mixtures thereof, although small amounts of high molecular weight alcohols can also be present without deleterious effect. "Low molecular weight alcohols" as used herein have 1 to 6 carbon atoms and can be saturated or unsaturated and monohydric or polyhydric. The monohydric alcohols can be either branched or straight-chain and include but are not limited to methanol, ethanol, 1-propanol, 2-propanol, 1-butanol, 2-methyl-1-propanol, 1-pentanol, allyl alcohol, crotyl alcohol, and the like. The polyhydric alcohols contain 2 or more —OH groups and can also be saturated or unsaturated and branched or straight-chain. Illustrative polyhydric alcohols include but are not limited to 1,2-ethanediol (ethylene glycol), 1,1-ethanediol, 1,2-propanediol, (propylene glycol), 1,4-butanediol, 2,3-butanediol, 2-butene-1,4-diol and the like.

Preferably, the low molecular weight alcohols used in the process of the present invention are saturated monohydric alcohols having 1 to 6 carbon atoms or mixtures thereof with methanol and ethanol being most preferred.

The process of the present invention does not require a co-feeding of hydrogen in order to effect the reforming of alcohols. The process of the present invention can therefore be conducted in the absence of co-fed hydrogen. The presence of hydrogen is not, however, deleterious to the process.

Depending upon the end use for the synthesis gas obtained by the reforming process of the present invention, it may be desirable to co-feed $H_2O$ or inert gases, such as nitrogen, carbon dioxide, helium, argon and the like. When reforming alcohols having more than one carbon atom, it may be desired to conduct the reforming reaction in the presence of an oxygen containing gas, such as air or steam, in order to effect the desired ratio of hydrogen and carbon monoxide in the product gas.

Catalyst

The catalysts utilized in the process of the present invention include distorted interstitial metal carbides in which the crystal lattice is somewhat distorted and significant carbon-carbon interaction can occur. The metals utilized are selected from Groups VIIA and VIIIA of the Periodic Table, including iron, cobalt, nickel, ruthenium, rhodium, palladium, osmium, iridium, platinum, manganese, rhenium and mixtures thereof. Preferred catalysts for the reforming process, particularly the methanol reforming process, include cobalt carbide, iron carbide, and manganese carbide. These preferred metal carbides exhibit high carbon selectivity to carbon monoxide, rather than to carbon dioxide or methane. Cobalt carbide is especially preferred.

The selectivity of the Group VIIA and VIIIA carbides to form carbon monoxide and hydrogen from alcohols are in marked contrast to Group VIA metal carbides, which also dissociate alcohols, but which exhibit carbon selectivity predominantly to methane.

The Group VIIA or VIIIA metal carbides utilized in the process of the present invention are commercially available, and may be produced by carbothermic reduction of the metal or metal oxide prior to being charged to the reactor, or the catalyst may be generated in situ via reaction of the reduced metal or metal oxide with a carbon-containing gas, such as methane or carbon monoxide. As such, the carbide may be present in either bulk form or as a surface carbide.

The catalysts can be either unsupported or supported on inert carriers such as alumina, silica, niobia, titania zirconia, silicon carbide, boron phosphate and the like.

Process Conditions

The alcohol is contacted in the vapor phase with the metal carbide catalyst at a reaction temperature of about 200° C. to about 600° C. Preferably, the reaction temperature is maintained at about 300° C. to about 500° C. The reaction temperature required can be maintained utilizing conventional means for heating the fluid bed or fixed bed reactors in which the reaction may be conducted.

In systems wherein the alcohol is being reformed to provide synthesis gas for combustion, as in an automobile, the heat required may be supplied, after engine ignition, by exhaust heat from the internal combustion engine, which generally is in a range of about 350° C.-600° C. When the process of the present invention is utilized to reform methanol to synthesis gas prior to combustion in an internal combustion engine, the resulting heat value gained by the combustion of synthesis gas rather than methanol itself is a 22 percent gain.

The alcohol reforming reaction of the present invention may be conducted at atmospheric, subatmospheric, or superatmospheric pressures, with about 1 to about 3 atmospheres being preferred, although the reaction can be carried out at up to 300 atmospheres.

The process of the present invention, particularly when reforming methanol, results in the formation of synthesis gas having approximately a 2/1 ratio of hydrogen/carbon monoxide, with minimal formation of carbon dioxide or methane.

SPECIFIC EMBODIMENTS OF THE INVENTION

The procedure followed in the examples set forth below included supporting the metal carbide catalysts on a porous frit inside a fused quartz reactor 18 inches in length, having a 20 millimeter internal diameter, vertically mounted inside an electric furnace. Methanol was delivered to the reactor at a flow rate of 0.1 milliliters per minute and was vaporized prior to entering the reactor. The methanol was passed upward through the catalyst bed in the presence of a flow of helium carrier gas of 10 milliliters per minute. The reactor was brought to temperature under helium flow only. The gaseous effluent was collected and analyzed by gas chromatography.

COMPARATIVE EXAMPLE 1

Methanol was introduced into the reactor as set forth above in the absence of catalyst at 200° C. for one half hour. The temperature was increased to 300° C. for one half hour and to 400° C. for one half hour. No carbon monoxide was produced in this reforming attempt, although small amounts of hydrogen and carbon dioxide were observed in the effluent.

EXAMPLES 2-4

Five grams of catalyst was charged to the reactor with methanol being introduced according to the procedure of Comparative Example 1. The catalysts utilized, selectivity to carbon monoxide and mole percentage of the products obtained are listed in Table I for Examples 1-9.

Carbon selectivity to carbon monoxide is equal to the number of moles of carbon monoxide formed multiplied by 100 percent and divided by the total number of moles of carbon atoms in the products.

EXAMPLE 5

Five grams of iron carbide was charged to the reactor, and methanol was introduced at 500° C. Essentially all of the methanol was reformed, with product percentages being as reported in Table 1.

COMPARATIVE EXAMPLES 6-9

In Comparative Example 6, five grams chromium carbide was charged to the reactor with methanol being introduced according to the procedure of Comparative Example 1. In Comparative Examples 7 and 8, five grams molybdenum carbide was charged to the reactor, with methanol being introduced into the reactor at 300° and 400° C. respectively.

In Comparative Example 9, five grams of tungsten carbide was charged to the reactor, and methanol was introduced at 400° C. Carbon selectivity and mole percentage products are reported in Table I for these examples. It should be noted that carbon selectivity was predominantly to methane and not to carbon monoxide, utilizing these comparative catalysts.

TABLE I

| Example No. | Catalyst | Temp. °C. | % Carbon Selectivity To CO | Mole % Product |||||||
|---|---|---|---|---|---|---|---|---|---|---|
| | | | | $H_2$ | CO | $CO_2$ | $CH_4$ | $C_2H_4$ | $C_2H_6$ | $C_3H_6$ |
| 2 | $Co_3C$ | 200–400 | 98.6 | 64.5 | 35.0 | 0.3 | 0.2 | — | — | — |
| 3 | $Fe_3C$ | 200–400 | 65.7 | 64 | 23.7 | 7.3 | 4.9 | 0.1 | — | — |
| 4 | $Mn_3C$—$Mn_5C_2$ | 200–400 | 76.3 | 70.6 | 22.4 | 4.8 | 2.1 | — | — | — |
| 5 | $Fe_3C$ | 500 | 69.4 | 67.5 | 22.6 | 6.6 | 3.3 | 0.05 | 0.02 | — |
| C6 | $Cr_3C_2$ | 200–400 | 39.2 | 52.9 | 15.2 | 7.9 | 24.1 | — | — | — |
| C7 | $Mo_2C$ | 300 | 14.0 | 4.7 | 13.4 | 7.8 | 74.1 | — | — | — |
| C8 | $Mo_2C$ | 400 | 14.8 | 13.0 | 13.2 | 5.5 | 66.4 | 1 | 0.9 | — |
| C9 | WC | 400 | 11.5 | 18.3 | 10 | 1.7 | 64.8 | 2.1 | 2.2 | 0.8 |

EXAMPLES 10–12

In Examples 10, 11, and 12, five grams of cobalt carbide, iron carbide, and manganese carbide, respectively, were charged to the reactor, and methanol was introduced at a reaction temperature of 400° C. for two hours. The percent methanol conversion, percent carbon selectivity to carbon monoxide and the mole percentage of products are reported in Table II for these examples. Carbon selectivity was predominantly to carbon monoxide utilizing these catalysts according to the process of the present invention.

As demonstrated in the Tables, the process of the present invention results in the reforming of alcohols, particularly methanol, to form hydrogen and predominantly carbon monoxide as the carbon-containing product. The catalysts utilized in the process of the present invention do not suffer deleterious effects with deposition of carbon on the catalyst.

Thus, it should be apparent to those skilled in the art that the present invention accomplishes the objects set forth above. It is to be understood that the the present invention is not to be limited by the examples set forth herein. These have been provided merely to demonstrate operability, and the selection of Group VII or VIII metal carbide catalysts, alcohols and reaction conditions can be determined from the total specification disclosure provided without departing from the spirit of the invention herein disclosed and described, the scope of the invention including equivalent embodiments, modifications and variations that fall within the scope of the attached claims.

We claim:

1. A process for reforming alcohols to synthesis gas comprising contacting an alcohol in the absence of steam with the catalyst comprising a carbide of a metal selected from iron, cobalt, manganese and mixtures thereof, at a reaction temperature of about 200° C. to about 600° C.

2. A process as in claim 1 wherein said alcohol is selected from saturated and unsaturated, monohydric or polyhydric alcohols having from 1 to about 6 carbon atoms.

3. A process as in claim 1 wherein said alcohol is methanol.

4. A process as in claim 1 wherein said alcohol is ethanol.

5. A process as in claim 1 wherein said catalyst is iron carbide.

6. A process as in claim 1 wherein said catalyst is cobalt carbide.

7. A process as in claim 1 wherein said catalyst is manganese carbide.

8. A process as in claim 1 wherein said reaction temperature is between about 300° C. to about 500° C.

9. A process as in claim 1 wherein said reforming is conducted at about atmospheric pressure.

10. A process as in claim 1 wherein said reforming is conducted at a reaction pressure of about 1 to about 300 atmospheres.

11. A process as in claim 1 wherein said alcohol is a by-product of a synthesis gas upgrading reaction.

12. A process as in claim 1 wherein the synthesis gas resulting from the reforming reaction is combusted.

13. A process as in claim 1 wherein said alcohol reforming is carried out in the absence of co-fed hydrogen.

14. A process as in claim 1 wherein oxygen is co-fed with the alcohol.

TABLE II

| Example No. | Catalyst | Temp. °C. | % Methanol Conversion | % Carbon Selectivity To CO | Mole % Product |||||
|---|---|---|---|---|---|---|---|---|---|
| | | | | | $H_2$ | CO | $CO_2$ | $CH_4$ | $C_2H_4$ |
| 10 | $Co_3C$ | 400 | 46.5 | 98.8 | 64.6 | 35.0 | 0.1 | 0.3 | — |
| 11 | $Fe_3C$ | 400 | 19.2 | 76.9 | 63.3 | 28.2 | 3.5 | 5.0 | 0.1 |
| 12 | $Mn_3C$—$Mn_5C_2$ | 400 | 21.0 | 75.0 | 70.2 | 22.4 | 4.6 | 2.8 | — |

15. A process for reforming methanol to obtain predominantly hydrogen and carbon monoxide comprising contacting methanol in the vapor phase at a reaction temperature of about 200° C. to about 600° C. with a catalyst comprising a carbide of a metal selected from iron, cobalt, and manganese.

* * * * *